United States Patent [19]

Jordan et al.

[11] Patent Number: 5,243,823

[45] Date of Patent: Sep. 14, 1993

[54] MASTER CYLINDER WITH NON-THREADED END CAP RETENTION

[75] Inventors: David D. Jordan, South Bend, Ind.; Howard J. Childs, Coloma; Peter R. Johnson, Troy, both of Mich.; Jack Martinic, Granger, Ind.; Eugene G. Wright, Three Oaks, Mich.

[73] Assignee: Allied-Signal Inc., Morristown, N.J.

[21] Appl. No.: 966,220

[22] Filed: Oct. 26, 1992

[51] Int. Cl.$^5$ ............................................. B60T 11/20
[52] U.S. Cl. ........................................ 60/562; 60/458; 92/169.1; 220/319; 220/326; 403/371
[58] Field of Search ............ 92/165 R, 168, 169.1; 60/458, 562, 588; 403/365, 367, 368, 371, 355, 356, 357, 358, D7, D9; 220/319, 326

[56] References Cited

U.S. PATENT DOCUMENTS

| | | | |
|---|---|---|---|
| 3,452,633 | 7/1969 | Hammon | 403/371 |
| 3,527,120 | 9/1970 | Duer et al. | 403/365 |
| 4,794,757 | 1/1989 | Schluter | 60/562 |

FOREIGN PATENT DOCUMENTS

| | | | |
|---|---|---|---|
| 2913174 | 10/1980 | Fed. Rep. of Germany | 60/562 |
| 208260 | 8/1989 | Japan | 92/169.1 |

OTHER PUBLICATIONS

Parmley, Standard Handbook of Fastening and Joining, copyrighted 1977, McGraw Hill Book Co., TJ1320.S74.

Primary Examiner—Edward K. Look
Assistant Examiner—F. Daniel Lopez
Attorney, Agent, or Firm—Larry J. Palguta; Ken C. Decker

[57] ABSTRACT

In a master cylinder (20), a cap (30) for guiding a primary piston (50) is located within an end opening (24) of a body (22) of the master cylinder (20). The end cap (30) retains a sleeve (40) and other components within a bore (12) of the master cylinder (20), and is attached to the body (22) of the master cylinder (20) by way of a biasing retention mechanism (45; 145, 150; 260). The mechanism (45; 145, 150; 260) may bias the end cap (30) axially inwardly of the bore (12), bias a gripping ring member (145) radially outwardly into engagement with the body (22) of the master cylinder (20), and retain a first end (32) of the end cap (30) within the bore (12) in accordance with the extent to which the first end (32) is inserted axially into the bore (12).

10 Claims, 4 Drawing Sheets

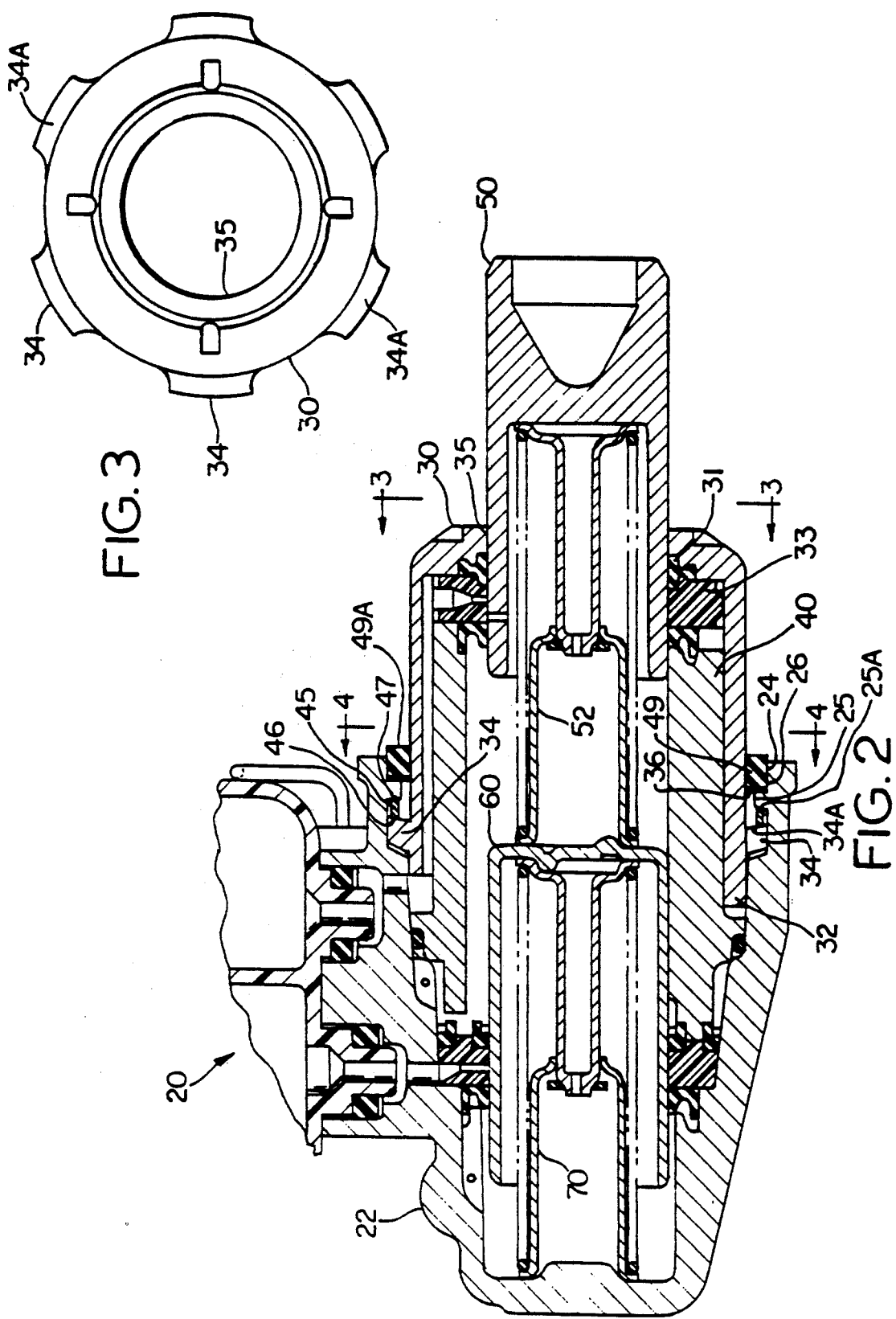

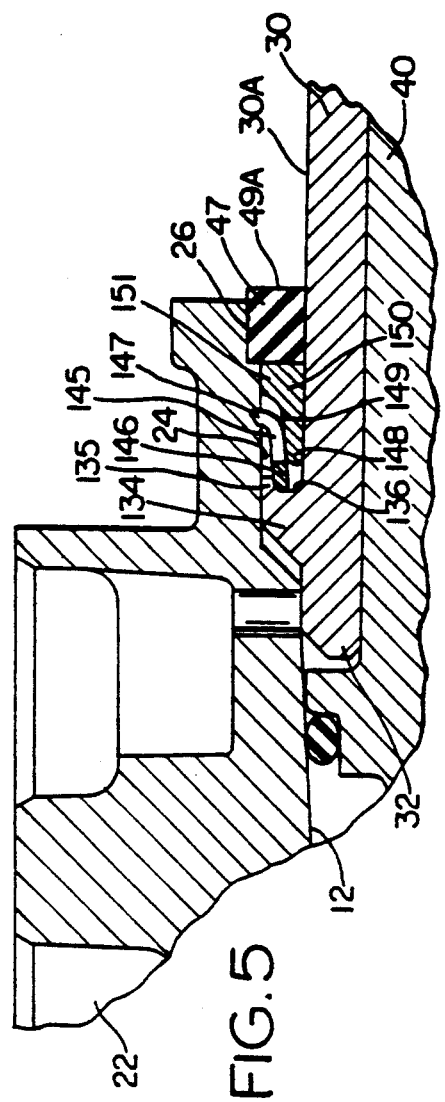
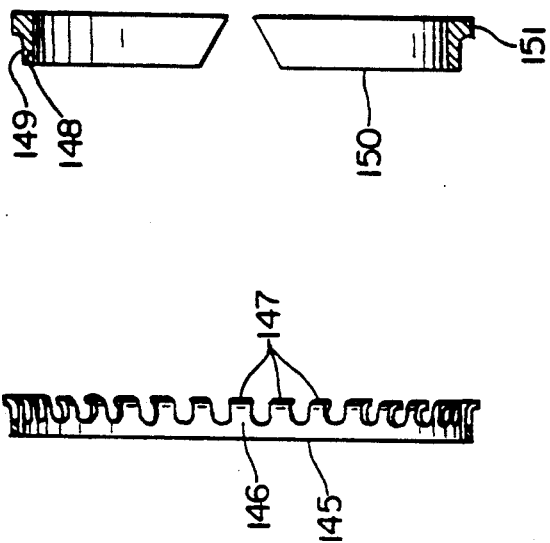
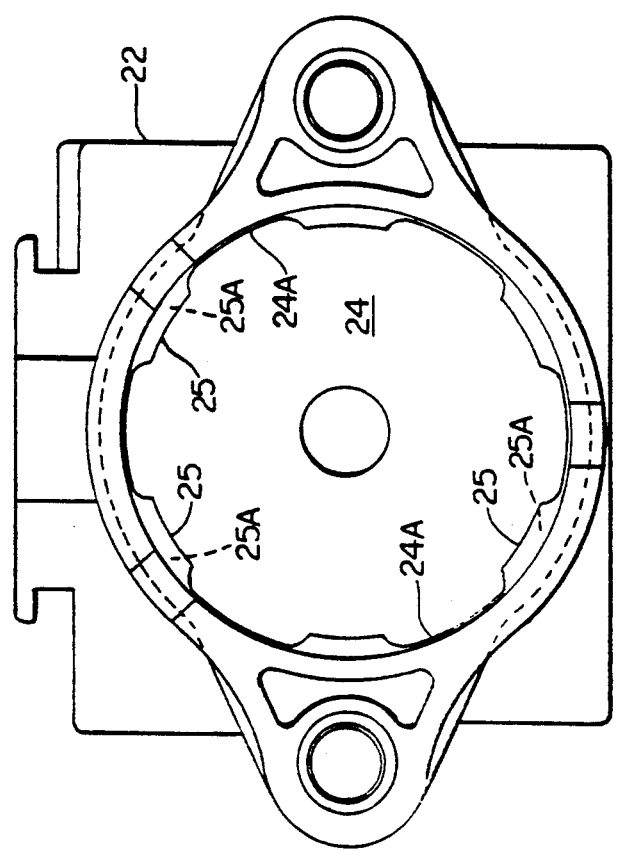
FIG.7
FIG.6
FIG.4
FIG.5

MASTER CYLINDER WITH NON-THREADED END CAP RETENTION

The present invention relates to a master cylinder, and in particular to a short length master cylinder having an end cap connected with a body of the master cylinder by way of a retention mechanism.

A short length master cylinder has been disclosed previously in Steer U.S. Pat. No. 4,474,005 assigned to the same assignee as herein, and in Mori et al U.S. Pat. No. 5,063,743. As illustrated in U.S. Pat. Nos. 4,474,005 and 5,063,743 and in FIG. 1 hereof, a sleeve member 14 is held, via other components such as a stationary land 11, within the bore of the master cylinder by an end cap 4 which has external threads 4A engaging internal threads 2A of master cylinder body 2. Providing such a master cylinder with threading of the end cap and threading of the master cylinder body entails additional cost, may be subject to contamination of the threads, concentricity problems between the threaded parts, galling which may occur between the threads each of which are made of aluminum, and twisting of the end cap 4 relative to the body as it engages a seal member 13 located between the stationary land 11 and rotating end cap 4. It is highly desirable to eliminate the above problems by reducing the cost of coupling the end cap with the master cylinder body, eliminating the potential for contamination between the parts, preventing concentricity and galling problems, and providing an assembly which does not have to be twisted together. The present invention provides solutions to the above problems by providing a retention mechanism which eliminates the use of threads, the possibility of contamination, concentricity, and galling problems. The present invention comprises a tandem type master cylinder, comprising a primary piston and a secondary piston arranged in tandem with the primary piston extending through an end opening in an end cap, the end cap connected with a body of the master cylinder and engaging at least one interior component of the master cylinder, the body having an end opening which includes circumferentially spaced-apart radial extensions extending radially inwardly, the end cap having circumferentially spaced-apart radial extensions extending radially outwardly from the end cap, each radial extension of the end cap located within the body to be spaced axially inwardly of the radial extensions of the body, each radial extension of the end cap having an angled wall disposed adjacent an angled radially extending wall of a radial extension of the body, and a resilient ring member located between said radial extensions and having angled side walls engaging the walls of the radial extensions such that resilient radially outward expansion of said resilient ring member biases said radial extensions axially away from one another and biases the end cap against the interior component of the master cylinder.

The invention is described in detail below with reference to the drawings which illustrate several embodiments in which:

FIG. 2 is a section view of a first embodiment of the present invention with a modification between the upper and lower views of the retention mechanism;

FIG. 3 is an end view of the end cap illustrated in FIG. 2 as viewed substantially along view line 3—3;

FIG. 4 is an end view of the body of the master cylinder of FIG. 2 as viewed substantially along view line 4—4;

FIG. 5 is a partial section view of a second embodiment of the present invention;

FIG. 6 is a side view of the gripping ring member of FIG. 5;

FIG. 7 is a section view of the wedge ring of FIG. 5;

Figure 1:
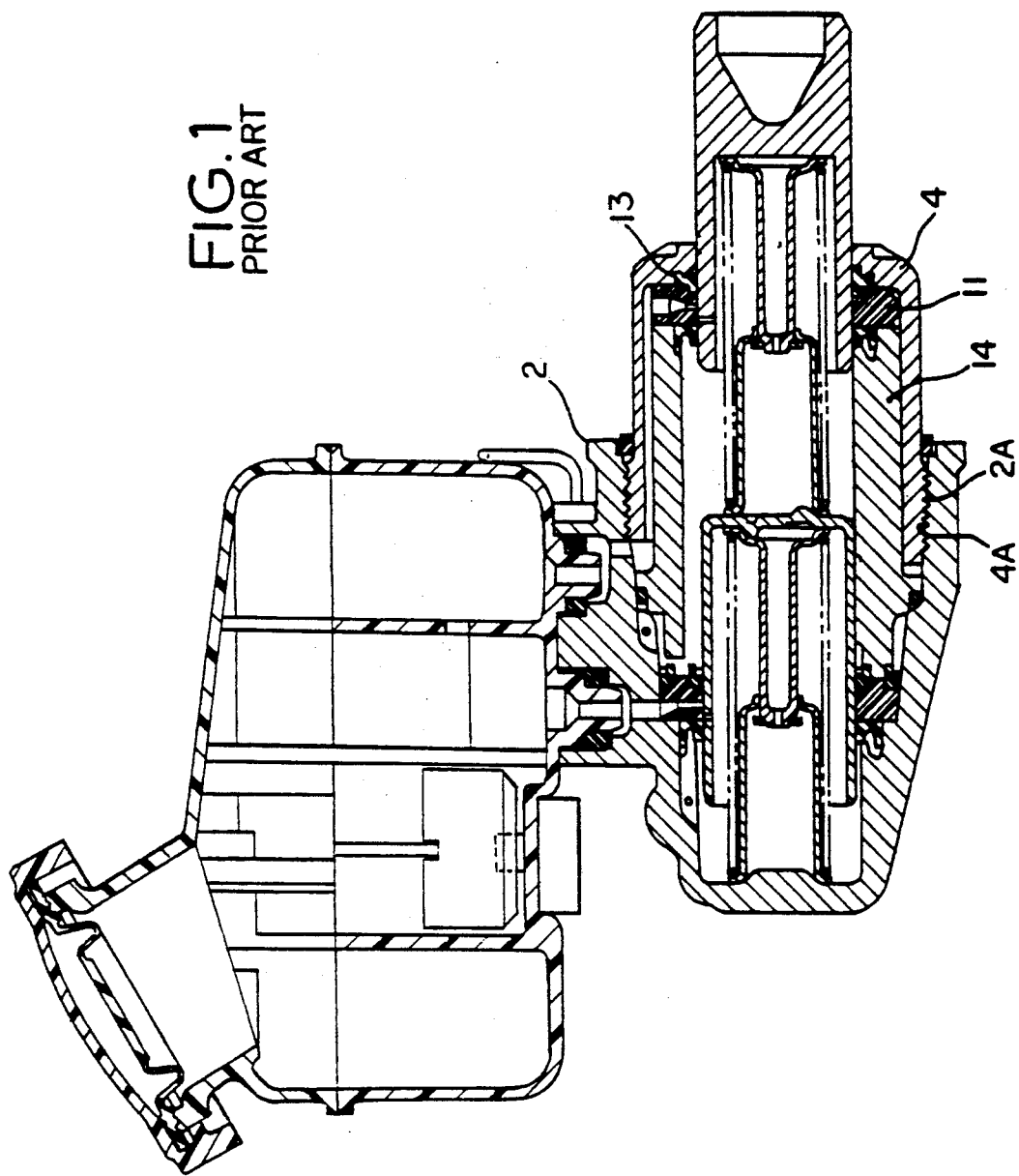
FIG. 1 is an illustration of a traditional short length master cylinder.

Referring to FIG. 2, a master cylinder is referenced generally by numeral 20 and includes body 22 having end opening 24 in which is located first end 32 of end cap 30 which engages seal 31 and land 33 that abuts sleeve member 40. End cap 30 through its connection with body 22 retains the interior components of the master cylinder including seals, lands and sleeve member within the bore of the master cylinder. Primary piston 50 is engaged by caged top hat assembly 52 which biases secondary piston 60 that is engaged by caged top hat assembly 70. Primary piston 50 extends through end opening 35 of end cap 30. End cap 30 includes a plurality of radially outwardly extending radial extensions 34 that are circumferentially spaced-apart from one another (see FIGS. 1 and 3), and each of which have a radially extending angled wall 34A. Body 22 includes a plurality of circumferentially spaced-apart radially inwardly extending radial extensions 25 (see FIGS. 1 and 4) containing radially extending angled walls 25A angled generally oppositely to walls 34A. Located between angled walls 34A and 25A is resilient split ring member 45 which contains ramped or angled side walls 46, 47 shaped complementary with adjacent walls 34A, 25A. Resilient ring 45 has a fully extended diameter greater than that illustrated in FIG. 2, such that the ring is resiliently biased radially outwardly and against walls 34A, 25A. Opening 24 includes groove 26 which provides a seat for metal washer 36 and seal 49. Master cylinder 20 is typically mounted to a vacuum brake booster so that the housing of the vacuum brake booster abuts sidewall 49A of seal 49 and traps the seal and metal washer 36 between the booster housing and groove 26.

To assemble master cylinder 20, when the end cap and associated members such as primary piston 50 and sleeve member 40 are inserted within bore 12 of housing body 22, radial extensions 34 pass between the recessed openings 24A located circumferentially between the radially inwardly extending extensions 25 (see FIGS. 3 and 4). End cap 30 may be turned slightly (see top view of extension 34 in FIG. 2) so that each wall 34A aligns circumferentially with a wall 25A, or not turned (see bottom view of extension 34 in FIG. 2) so that the extensions 34 remain aligned with the recessed openings 24A. The split ring member 45 is then inserted by a tool into opening 24 such that when it is moved past walls 25A of radial extensions 25, the spring naturally extends radially and resiliently outwardly to bias itself between walls 34A, 25A. This diametral expansion of ring 45 causes, via ramped walls 46, 47, engagement with angled walls 34A, 25A so that radial extensions 34 and end cap 30 move axially inwardly of bore 12. End cap 30 biases inwardly of bore 12 the seal 31, land 33, sleeve member 40, and other interior components of the master cylinder. Thus, the end cap is securely held in engagement with the interior components of the master cylinder. Metal washer 36 and seal 49 may then be inserted within groove 26 which holds them tightly in place until the master cylinder is mounted on the front of a vacuum brake booster.

FIG. 5 is a partial illustration of the master cylinder illustrated in FIG. 2 and contains a second embodiment of the retention mechanism which couples the end cap with the master cylinder body. Body 22 includes end opening 24 which receives end cap 30 that includes continuous radial extension 134 which has axially extending portion 135 that defines with outer circumferential surface 30A an axially extending recess 136. Gripping ring member 145 comprises either a stamped split ring or a continuous ring (see FIG. 6) having circumferential axial portion 146 from which extends a plurality of radially outwardly extending gripping fingers 147. Split wedge ring 150 (see FIG. 7) includes axially extending ramp portion 148 having sloped surface 149 extending to radial portion 151. End opening 24 includes groove 26 which receives therein seal 47 having sidewall 49A that will abut the housing of a vacuum brake booster.

When end cap 30 and associated interior components of master cylinder 20 such as primary piston 50, caging assembly 52, secondary piston 60, cage assembly 70 and sleeve 40 are inserted within bore 12, interior end 32 of end cap 30 is inserted within opening 24 and then gripping ring 145 is inserted within opening 24 between body 22 and the outer surface 30A of end cap 30. Split wedge ring 150 is then inserted within end opening 24 and moved axially such that ramp portion 148 biases gripping ring member 145 radially outwardly whereby axial portion 146 of member 145 engages axially extending portion 135 defining the outer portion of recess 136. Additionally, wedge ring 150 causes, via sloped surface 149, gripping fingers 147 to be biased radially outwardly to engage and dig into body 22 which is made of aluminum. Thus, the axial displacement of split wedge ring 150 into opening 24 of master cylinder 20 causes gripping ring member 145 to be located a predetermined distance apart from outer surface 30A of end cap 30 such that fingers 147 engage and dig into body 22. Split wedge ring 150 may be moved axially to the extent that fingers 147 engage radial part 151. Seal 47 may then be inserted in groove 26, and the master cylinder then mounted on a not shown vacuum brake booster.

Figure 9:
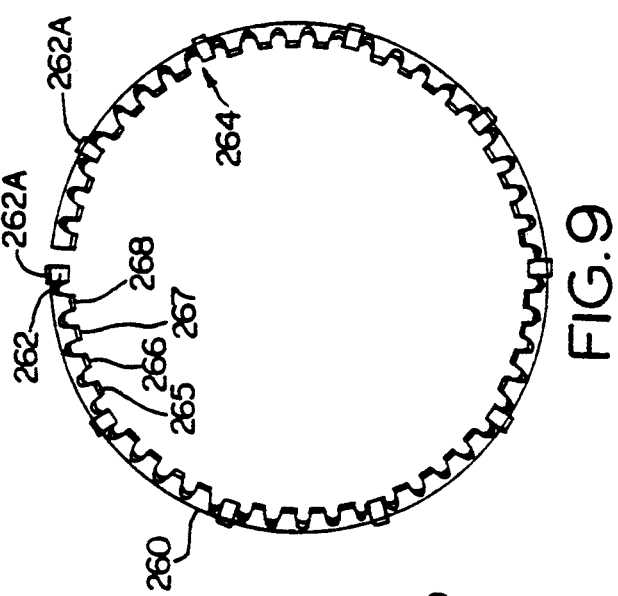
FIG. 9 is a view of the retaining ring of FIG. 8.
Figure 8:
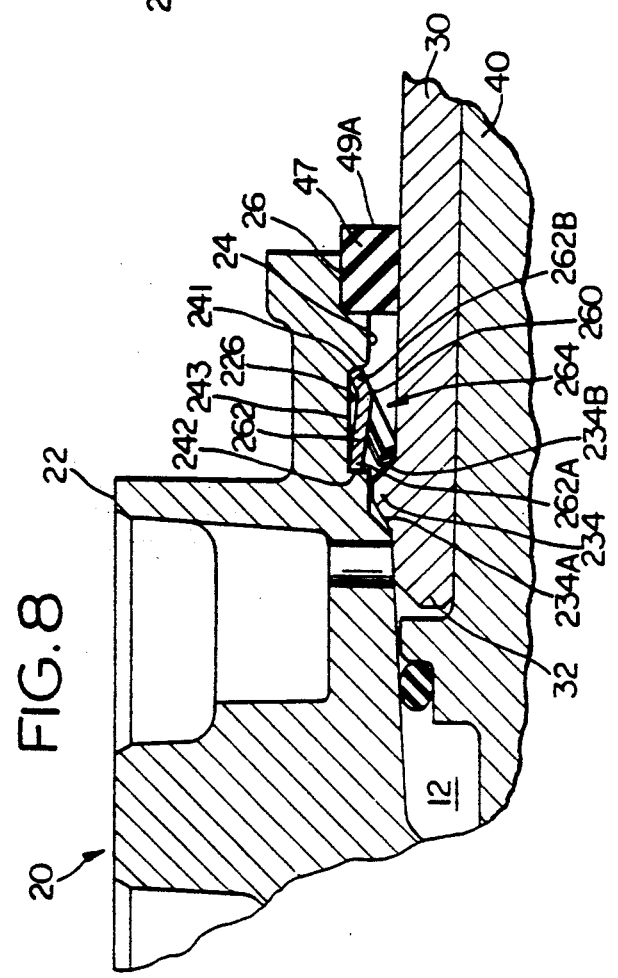
FIG. 8 is a partial section of a third embodiment of the present invention.
Figure 10:
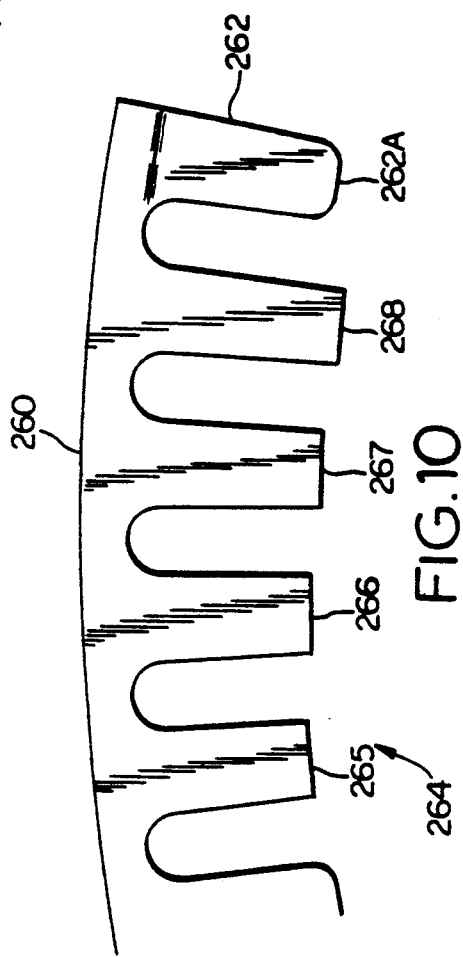
FIG. 10 is an enlarged partial view of the flexible fingers of the retaining ring illustrated in FIGS. 8 and 9.

FIG. 8 illustrates in partial section view master cylinder 20 having body 22 with bore 12 receiving first end 32 of end cap 30. Seal 47 in body groove 26 will abut the housing of a not shown vacuum brake booster. End cap 30 includes at first end 32 continuous radially outwardly extending abutment 234 which includes first sloped wall 234A and second sloped wall 234B. Second sloped wall 234B has a greater slope than first sloped wall 234A. End opening 24 includes radially outwardly extending interior groove 226 defined by a pair of radially extending, axially spaced-apart sidewalls 241 and 242. Radially extending sidewall 242 is disposed orthogonally relative to top surface 243 of groove 226, while radially extending sidewall 241 is disposed at a nonorthogonal angle relative to surface 243. Located within groove 226 is flexible finger split retaining ring 260 which comprises a generally axially extending first part 262 from which extends a plurality of variable length flexible fingers indicated generally by reference numeral 264. As illustrated more clearly in FIGS. 9 and 10, the variable length fingers comprise fingers 265, 266, 267 and 268.

Each of the fingers extends axially a different axial length so that the appropriate length finger may engage second sloped wall 234B depending on the axial position of end cap 30 relative to body 22. When end cap 30 and the associated interior components of master cylinder 20 such as first piston 50, top hat assembly 52, second piston 60, top hat assembly 70 and sleeve member 40 are inserted into bore 12, abutment 234 of cap 30 is located axially interiorly of body 22 relative to groove 226. Then by means of a tool, split retaining ring 260 is inserted into opening 24 and displaced axially until part 262 expands radially outwardly into groove 226. Part 262 is positioned so that opposite ends 262A and 262B engage respectively end walls 242 and 241 to position ring 260 axially relative to body 22 and bore 12. Fingers 264 extend radially downwardly and when end cap 30 is inserted into opening 24, abutment 234 passes axially by ring 260 such that first sloped wall 234A causes resilient fingers 264 to be biased upwardly. As abutment 234 passes axially past fingers 264, the fingers, according to their appropriate lengths, ride down second sloped wall 234B. End cap 30 is then pressed axially into bore 12 to load or bias the interior components of the master cylinder, and according to the extent of the axial insertion of end cap 30 into bore 12, the appropriate length flexible fingers 264 engage second sloped surface 234B to hold end cap 30 within bore 12. Thus, any differences in tolerances are automatically compensated and end cap 30 and the interior components of the master cylinder are held tightly within bore 12.

The retention mechanisms of the present invention provide numerous substantial advantages over prior constructions utilizing a threaded end cap and threaded body. The threadings of both the end cap and the body have been eliminated, and thereby eliminating the cost of this procedure. Additionally, there is no problem of contamination occurring between the previously used threads. Because the end cap is inserted axially into bore 12 without any substantial twisting or rotating relative to body 22 when cap 30 is biased against O-ring seal 31 (FIG. 2), O-ring seal 31 disposed between the end cap and the rear land 33 is no longer twisted so that wrinkling of seal 31 and associated leakage problems are prevented. The three embodiments of the present invention provide a positive loading or zero axial tolerance against the internal piece parts of the master cylinder, just as the prior threaded assembly had provided. The present invention eliminates any concentricity problems that may have occurred previously between the threaded parts. Threaded parts made of aluminum can also experience galling problems and this has been eliminated. The present invention also provides a tamper proof field assembly to prevent field misassembly when the master cylinder is being serviced. Additionally, the present invention provides an assembly in which the piece parts can be easily disassembled and reassembled if necessary.

We claim:

1. A tandem type master cylinder, comprising a primary piston and a secondary piston arranged in tandem with the primary piston extending through an end opening in an end cap, the end cap connected with a body of the master cylinder and engaging at least one interior component of the master cylinder, the body having an end opening which includes circumferentially spaced-apart radial extensions extending radially inwardly, the end cap having circumferentially spaced-apart radial extensions extending radially outwardly from the end cap, each radial extension of the end cap located within the body to be spaced axially inwardly of the radial extensions of the body, each radial extension of the end cap having an angled wall disposed adjacent an angled radially extending wall of a radial extension of the body, and a resilient ring member located between said radial extensions and having angled side walls engaging the walls of the radial extensions such that resilient radially outward expansion of said resilient ring member biases said radial extensions axially away from one another and biases the end cap against the interior component of the master cylinder.

2. The master cylinder in accordance with claim 1, wherein the radial extensions of the end cap and body are located in circumferential alignment with one another.

3. The master cylinder in accordance with claim 2, further comprising a washer member and seal at the periphery of the end opening of the body.

4. The master cylinder in accordance with claim 1, wherein the radial extensions of the end cap and body are in circumferential nonalignment with one another.

5. A tandem type master cylinder, comprising a primary piston and a secondary piston arranged in tandem within a body of the master cylinder, the body having an end opening in which is located an interior end of an end cap having the end opening through which extends the primary piston, the end cap having at an interior end located within the opening of the body a radial extension disposed circumferentially therabout, the radial extension having an axially extending portion to define an axially extending recess along a circumferential surface of said end cap, a gripping ring member located within the end opening of said body and disposed radially between the body and the interior end of the cap, the gripping ring member comprising a plurality of radially outwardly extending fingers extending from an axial portion of said ring member, and a wedge ring disposed within the end opening of the body to be between the body and the end cap, the wedge ring including an axially extending ramp portion engaging the gripping ring member to bias the axial portion into tight engagement with the axially extending portion of the radial extension and the fingers into tight engagement with the body, such that axial displacement of the wedge ring the recess and against the ring member locates said gripping ring member at a location radially spaced-apart from the circumferential surface whereby the fingers tightly engage the body.

6. The master cylinder in accordance with claim 5, wherein the wedge ring comprises a split ring.

7. The master cylinder in accordance with claim 6, further comprising a seal member located within the end opening of the body and abutting said wedge ring.

8. A tandem type master cylinder comprising a primary piston and a secondary piston located within a body of the master cylinder, the body having an end opening in which is received a first end of an end cap, the body including a radially outwardly extending interior groove communicating with the end opening, the end cap having a radially outwardly extending abutment located about the circumference of the first end and disposed axially inwardly relative to the groove, and a retaining ring having variable length flexible fingers extending angularly therefrom, the retaining ring comprising a generally axially extending first part located within the groove and between generally radially extending side walls of said groove to position axially the retaining ring, and the variable length flexible fingers extending radially inwardly at an angle relative to said first part and at least some of the fingers engaging said abutment in accordance with the axial position of the abutment relative to the body.

9. The master cylinder in accordance with claim 8, further comprising a seal disposed within a groove at the end opening and located between the body and the end cap.

10. The master cylinder in accordance with claim 9, wherein said abutment comprises a sloped first wall and a sloped second wall, the sloped first wall located axially inwardly of the end opening of the body, and the sloped second wall having a greater slope than the slope of the first wall to provide for positive abutment with appropriate variable length fingers.

* * * * *